United States Patent
Rubin et al.

(10) Patent No.: US 9,573,049 B2
(45) Date of Patent: Feb. 21, 2017

(54) STRUM PAD

(71) Applicants: Samuel Rubin, Brooklyn, NY (US); David Leiberman, Brooklyn, NY (US)

(72) Inventors: Samuel Rubin, Brooklyn, NY (US); David Leiberman, Brooklyn, NY (US)

(73) Assignee: MIBBLIO, INC., Brooklyn, NY (US)

( * ) Notice: Subject to any disclaimer, the term of this patent is extended or adjusted under 35 U.S.C. 154(b) by 412 days.

(21) Appl. No.: 14/149,428

(22) Filed: Jan. 7, 2014

(65) Prior Publication Data

US 2014/0194202 A1 Jul. 10, 2014

Related U.S. Application Data

(60) Provisional application No. 61/749,861, filed on Jan. 7, 2013.

(51) Int. Cl.
*A63F 9/24* (2006.01)
*A63F 13/20* (2014.01)
(Continued)

(52) U.S. Cl.
CPC ........... *A63F 13/06* (2013.01); *A63F 13/10* (2013.01); *A63F 13/2145* (2014.09); *A63F 13/54* (2014.09); *A63F 13/814* (2014.09); *G10H 1/368* (2013.01); *G10H 1/386* (2013.01); *G10H 2210/081* (2013.01); *G10H 2210/111* (2013.01); *G10H 2210/576* (2013.01); *G10H 2220/015* (2013.01); *G10H 2220/096* (2013.01); *G10H 2220/201* (2013.01); *G10H 2220/241* (2013.01); *G10H 2230/015* (2013.01); *G10H 2230/065* (2013.01); *G10H 2230/111* (2013.01); *G10H 2230/125* (2013.01); *G10H 2230/135* (2013.01); *G10H 2230/151* (2013.01);
(Continued)

(58) Field of Classification Search
USPC ................................................ 463/29–42
See application file for complete search history.

(56) References Cited

U.S. PATENT DOCUMENTS

| 5,210,367 A | 5/1993 | Taguchi et al. |
| 8,138,409 B2 | 3/2012 | Brennan |

(Continued)

FOREIGN PATENT DOCUMENTS

| WO | 2009007512 A1 | 1/2009 |
| WO | 2010008509 A2 | 1/2010 |
| WO | 2013028315 A1 | 2/2013 |

OTHER PUBLICATIONS

"ZooZBeat: a Gesture-based Mobile Music Studio", Gil Weinberg; Andrew Beck; Mark Godfrey, Engineering Village Compendex.

*Primary Examiner* — Masud Ahmed
(74) *Attorney, Agent, or Firm* — Robert W. Morris; Eckert Seamans Cherin & Mellott, LLC

(57) ABSTRACT

Various embodiments are provided generally relating to providing a strum pad on a user device. In some embodiments, a musical arrangement may be provided on a user device. A score of the musical arrangement may be tracked as it plays. In some embodiments, gestures may be detected on the user device while the user device plays the musical arrangement. In response to detecting the gesture, a component piece for the musical arrangement may be outputted. In some embodiments, the outputted component piece may correspond to the tracked score of the musical arrangement.

18 Claims, 10 Drawing Sheets

(51) Int. Cl.
 *A63F 13/40* (2014.01)
 *A63F 13/814* (2014.01)
 *A63F 13/2145* (2014.01)
 *A63F 13/54* (2014.01)
 *G10H 1/36* (2006.01)
 *G10H 1/38* (2006.01)

(52) U.S. Cl.
 CPC . *G10H 2230/275* (2013.01); *G10H 2240/175* (2013.01); *G10H 2250/451* (2013.01)

(56) References Cited

U.S. PATENT DOCUMENTS

| | | | |
|---|---|---|---|
| 8,222,507 B1 | 7/2012 | Salazar et al. | |
| 2006/0150803 A1 | 7/2006 | Taub | |
| 2008/0102958 A1* | 5/2008 | Kitamura | A63F 13/12 463/42 |
| 2009/0293705 A1* | 12/2009 | Vered | G10H 1/0008 84/609 |
| 2009/0312086 A1* | 12/2009 | Kanellos | G07F 17/32 463/20 |
| 2011/0319160 A1* | 12/2011 | Arn | A63F 13/10 463/30 |
| 2012/0089390 A1 | 4/2012 | Yang et al. | |
| 2012/0174736 A1* | 7/2012 | Wang | G10H 1/0008 84/622 |
| 2013/0180384 A1* | 7/2013 | Van Wagoner | G10G 1/02 84/485 R |
| 2013/0180385 A1* | 7/2013 | Hamilton | G10H 1/0016 84/603 |
| 2013/0318464 A1* | 11/2013 | Lengeling | G06F 3/04886 715/773 |
| 2014/0080606 A1* | 3/2014 | Gillet | A63F 13/00 463/35 |

* cited by examiner

STRUM PAD

CROSS-REFERENCE TO RELATED APPLICATIONS

This application claims the benefit of U.S. Provisional Patent Application No. 61/749,861, filed Jan. 7, 2013, the disclosure of which is fully incorporated herein by reference in its entirety.

FIELD OF THE INVENTION

This generally relates to systems and methods for providing a strum pad on a user device.

BACKGROUND OF THE INVENTION

Musical instruments, while being extremely enlightening and inspiring, can be difficult for novices to play. Individuals who are not proficient in a particular instrument, such as a guitar, may still desire to "jam" with friends or to play along with a particular musical arrangement. However, this may prove to be difficult when some of the friends involved in the jam have different skill levels or if the user does not know the particular chord progression of the musical arrangement. For example, individuals who are at a lower skill level may not be able to keep up with others in the jam who are at a higher skill level. These issues may be compounded by the difficulties associated with particular instruments that require greater hand-eye coordination or dexterity. For example, a violin or ukulele may be more difficult for someone to play than a tambourine because of the need for one hand to form chords with an instrument's strings and the other to strum or pluck the strings. Thus, it would be beneficial for there to be systems and methods that allow users to play a variety of component pieces associated with a musical arrangement, such as a guitar or drum part, "in-time" with the progression of the musical arrangement regardless of the user's musical proficiency.

SUMMARY OF THE INVENTION

Systems, methods, and non-transitory computer readable media for presenting a user with an interactive user interface that may enable a user to play along with a musical arrangement in-time are provided. Such systems may include control circuitry, communications circuitry, input and output interfaces, and memory including instructions.

Such methods may include providing a musical arrangement on a user device. In some embodiments, the musical arrangement may be a sing-a-long, such as "The Wheels on the Bus". A score of the musical arrangement may be tracked as the musical arrangement plays. For example, a chord progression of the musical arrangement may be tracked as the musical arrangement plays. The musical arrangement may play a first chord for a certain period of time, and then it may play another chord for another period of time. For example, the musical arrangement may play a "C-Major" chord for four (4) measures, followed by two (2) measured of a "G-Major" chord. Thus, the progression from the first chord to the second chord may be tracked as the musical arrangement plays.

In some embodiments, a gesture may be detected by the user device while the musical arrangement plays. For example, the musical arrangement may be outputted through speakers located on the user device and a swiping gesture may be detected by a user interface displayed on the user device. In response to detecting the gesture, the user device may play a component piece for the musical arrangement along with the musical arrangement. The component piece may correspond to any instrument's musical part within a certain musical arrangement. For example, a certain musical arrangement may include a guitar, piano, and drum parts. The component piece may, in some embodiments, correspond to the tracked score of the musical arrangement. For example, the musical arrangement may be tracked and determined to be in a particular chord or key at the tracked position. The detected gesture may cause the user device to output the determined chord for the particular component piece in-time with the musical arrangement at the tracked position. This may provide a harmonious sound at any point of the musical arrangement because at any point the outputted component piece will be in-time as well as in tune with the musical arrangement. For example, as the chord progression changes from the first chord to the second chord, the outputted component piece may change from playing in the first chord to the second chord.

Such methods may also include playing a musical arrangement using one or more audio outputs located on a user device. For example, the user device may include one or more speakers and/or may be connected to one or more external speakers which may output the musical arrangement. In some embodiments, a component piece for the musical arrangement may be assigned to a strum pad. The strum pad may be an interactive portion of a user interface displayed on a display screen of the user device. In some embodiments, the strum pad may display virtual strings corresponding to a stringed instrument. For example, the strum pad may correspond to a guitar and may include six (6) strings corresponding to the six guitar strings typically found on a physical guitar. In some embodiments, the strum pad may allow a user to play the stringed instrument using the user device. In response to detecting a user input on the strum pad, a component piece may output from the one or more audio outputs along with the musical arrangement. In some embodiments, the musical arrangement may be tracked and the component piece output may correspond to the tracked position of the musical arrangement. For example, the user may strum a guitar part of the musical arrangement using the strum pad. As the musical arrangement plays, the user may provide strumming gestures to the strum pad and the guitar part of the musical arrangement may be played in time and in tune with the musical arrangement.

Such methods may additionally include orientating a user device to play a strum pad displayed within a user interface on a user device. For example, a user may want to play a guitar part of a musical arrangement using the strum pad. In some embodiments, the user may orient their user device substantially horizontal, as if the user device were a guitar, to play the guitar portion. In some embodiments, the user may position the strum pad within the user interface based on a user preference. For example, if the user is right-handed, the strum pad may be positioned in a lower right corner of the user interface, whereas if the user is left-handed, the strum pad may be position in a lower left corner of the user interface. In some embodiments, a component piece for the musical arrangement may be selected based on the orientation of the user device. For example, the user may orient their user device substantially like a guitar, and the guitar part for the musical arrangement may be selected to be played by the strum pad.

In some embodiments, an input may be provided to the strum pad to play the component piece along with the musical arrangement. The input may be provided to the user device in a direction corresponding to the orientation and positioning of the strum pad. For example, the user may provide a guitar strumming gesture to play the guitar part of the musical arrangement. In this scenario, the user may have oriented the device substantially like a guitar and placed the strum pad in a suitable position on the user device. In response to providing the strumming input, the guitar part for the musical arrangement may play along with the musical arrangement in time and in tune with a current position of a score of the musical arrangement.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF THE INVENTION

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features.

Figure 1:
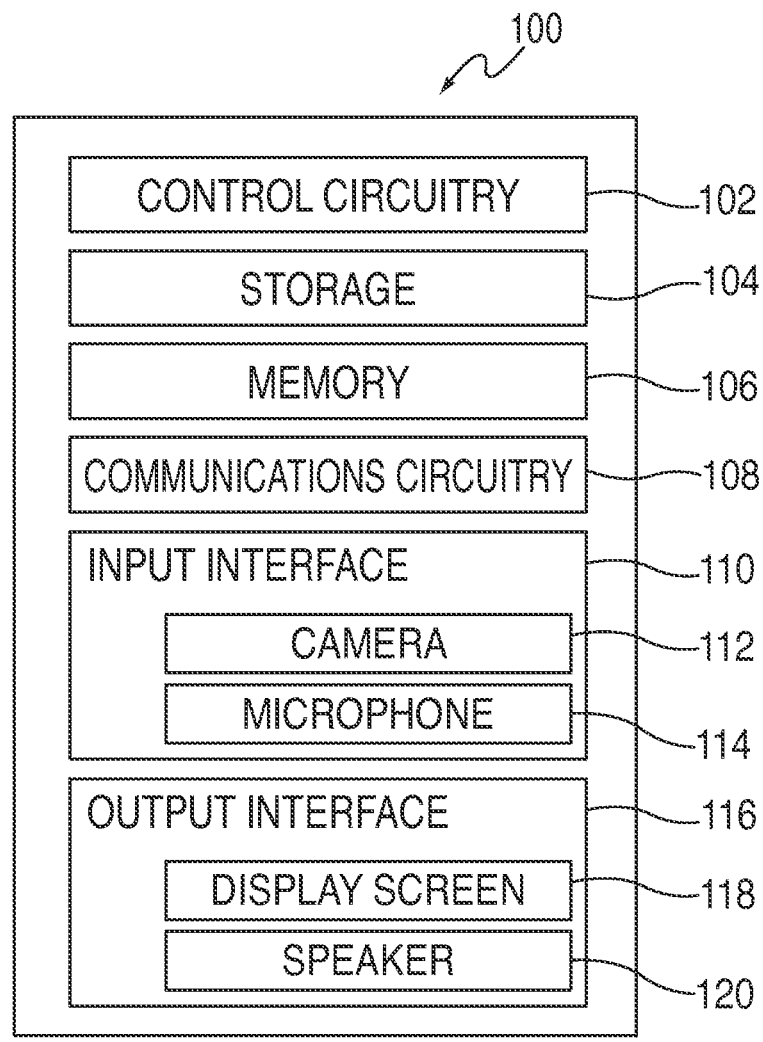
FIG. 1 is an illustrative block diagram of a user device in accordance with various embodiments.

FIG. 1 is an illustrative block diagram of a user device that may in accordance with various embodiments. In some embodiments, device 100 may include control circuitry 102, storage 104, memory 106, communications circuitry 108, input interface 110, and output interface 116. In some embodiments, one or more of the previously mentioned components may be combined with another component, omitted, and/or an additional component may be added. For example, memory 104 and storage 106 may be combined into a single element for storing data. As another example, device 100 may additionally include a power supply, a bus connector, or any other additional component. In some embodiments, device 100 may include multiple instances of one or more of the components included therein. However, for the sake of simplicity only one of each component has been shown in FIG. 1.

Control circuitry 102 may include one or more processors operative to control operations and performance of a user device, such as device 100. Control circuitry 102 may run the device's operation system, applications resident on the device, firmware applications, media applications, and/or any other type of application, or any combination thereof. In some embodiments, control circuitry 102 may process one or more inputs detected by device 100 and perform one or more actions in response to the detected inputs. In some embodiments, control circuitry 102 may facilitate communications between various components within device 100.

Memory 104 and storage 106 may be any component or combination of components within device 100. In some embodiments, memory 104 and/or storage 106 may include one or more storage media. Various types of storage media may include, but are not limited to, hard-drives, solid state drives, flash memory, permanent memory (e.g., ROM), or any other storage type, or any combination thereof. Any form of data or content may be stored within memory 104 and/or storage 106, such as photographs, music files, videos, contact information, applications, documents, or any other file, or any combination thereof. Memory 104 may include cache memory, semi-permanent memory (e.g., RAM), or any other memory type, or any combination thereof. In some embodiments, memory 104 and/or storage 106 may be used in place of and/or in addition to external storage for storing data on device 100.

Communications circuitry 108 may include any circuitry capable of connecting to a communications network and/or transmitting communications (voice or data) to one or more devices and/or servers. Communications circuitry 108 may interface with a communications network using any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quadband, VOIP, or any other protocol, or any combination thereof.

Input interface 110 may include any suitable mechanism or component for receiving inputs from a user operating device 100. In some embodiments, user interface 110 may include camera 112. Camera 112 may correspond to any image capturing component capable of capturing images and/or videos. For example, camera 112 may capture photographs, sequences of photographs, rapid shots, videos, or any other type of image, or any combination thereof. In some embodiments, device 100 may include one or more instances of camera 112. For example, device 100 may include a front-facing camera and a rear-facing camera. Although only one camera is shown in FIG. 1 to be within device 100, persons of ordinary skill in the art will recognize that any number of cameras, and any camera type may be included, and the use of only one camera within device 100 is merely exemplary.

In some embodiments, device 100 may include microphone 114. Microphone 114 may be any component capable of detecting audio signals. For example, microphone 114 may include one more sensors for generating electrical signals and circuitry capable of processing the generated electrical signals. Input interface 110 may also include, but is not limited to, an external keyboard, mouse, joystick, musical interface (e.g., musical keyboard), or any other suitable input mechanism, or any combination thereof. For example, input interface 110 may include an external strum pad or external drum pad capable of being connected to user device 100.

Output interface 116 may include any suitable mechanism or component for generating outputs from a user operating device 100. In some embodiments, output interface 116 may include display screen 118. Display screen 118 may include any type of display capable of presenting content to a user and/or on a user device. Display 118 may be any size and may be located on one or more regions/sides of device 100. For example, display 118 may fully occupy a first side of device 100, or may occupy a portion of the first side. Various display types may include, but are not limited to, liquid crystal displays ("LCD"), monochrome displays, color graphics adapter ("CGA") displays, enhanced graphics adapter ("EGA") displays, variable graphics array ("VGA") displays, or any other display type, or any combination thereof. In some embodiments, display 118 may be a touch screen and/or an interactive display. In some embodiments, the touch screen may include a multi-touch panel coupled to control circuitry 102. In some embodiments, display 118 may be a touch screen and may include capacitive sensing panels.

In some embodiments, output interface 116 may include speaker 120. Speaker 120 may correspond to any suitable mechanism for outputting audio signals. For example, speaker 120 may include one or more speaker units, transducers, or array of speakers and/or transducers capable of broadcasting audio signals and audio content to a room where device 100 may be located. In some embodiments, speaker 120 may correspond to headphones or ear buds capable of broadcasting audio directly to a user.

Figure 2:
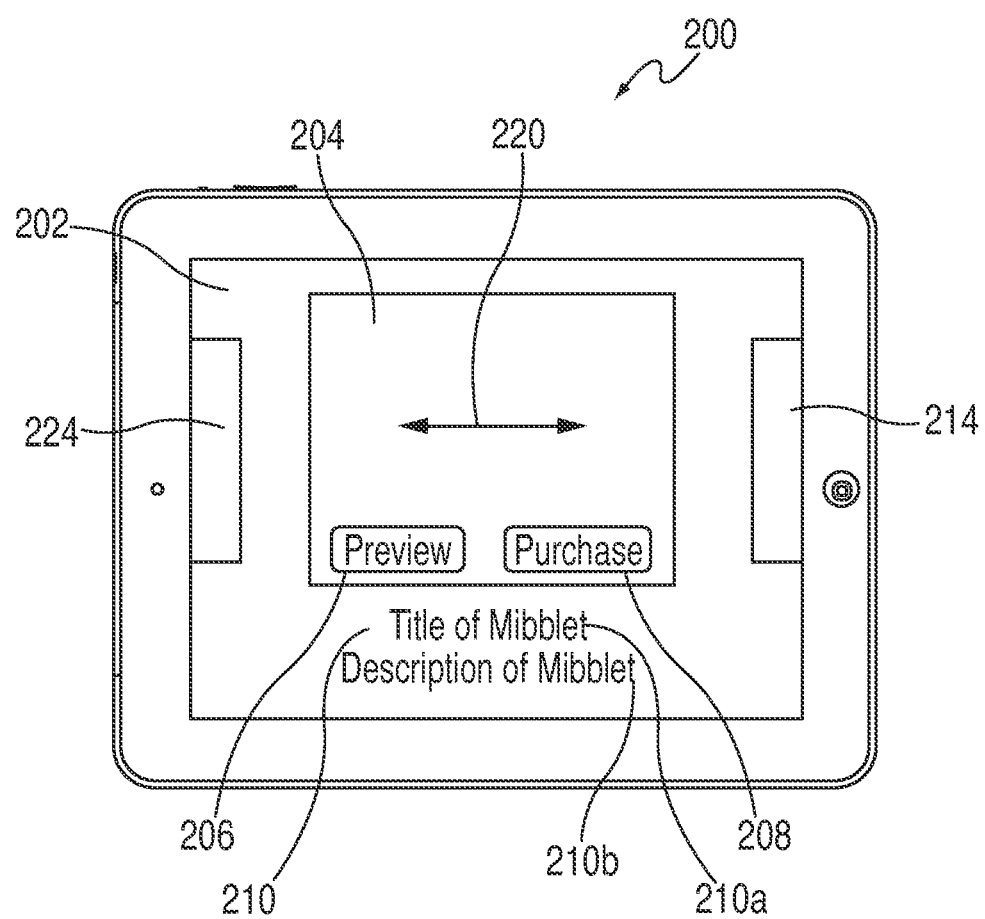
FIG. 2 is an illustrative diagram of a user interface displayed on a user device in accordance with various embodiments.

FIG. 2 is an illustrative diagram of a user interface displayed on a user device in accordance with various embodiments. Display screen 200 may be any display screen presented on a user device, such as device 100 of FIG. 1. In some embodiments, display screen 200 may occupy any portion of the user device. For example, display screen 200 may fully occupy, or occupy a portion of, one side of the user device. In some embodiments, display screen 200 may display user interface 202 thereon.

User interface 202 may, in some embodiments, correspond to an interactive musical arrangement or content management system allowing a user to purchase one or more interactive musical arrangements. In some embodiments, a user may connect with the content management system using communications circuitry, such as communications circuitry 108 of FIG. 1. Upon connecting to the content management system, the user may be presented with one or more interactive musical arrangements capable of being purchased and/or downloaded to the user device. For example, interactive musical arrangement 204 may be displayed within user interface 202. In some embodiments, a user may preview interactive musical arrangement 204 by pressing preview button 206. For example, preview button 206 may download a small version, a clip, or one or more images or slides of interactive musical arrangement 204 that the user may view prior to downloading or purchasing.

In some embodiments, interface 202 may include purchase button 208, which may enable the user to purchase arrangement 204. Selection of button 208 may cause the user to input purchasing information (e.g., credit card information, username, password, fingerprint, etc.), which may allow the user to purchase arrangement 204. In some embodiments, the user may purchase arrangement 204 through the content management system.

In some embodiments, musical arrangement 204 may include title information 210. Any information may be included within title information 210, such as arrangement title 210a and/or arrangement description 210b. For example, title 210a may display the title of musical arrangement 204. As another example, description 210b may present a brief written and/or pictorial description of arrangement 204. Although only title information 210a and arrangement description 210b may be displayed within user interface 202, persons of ordinary skill in the art will recognize that any information corresponding to arrangement 204 may be included, and the previous illustrations are merely exemplary.

In some embodiments, a user may view one or more additional musical arrangements presented by the content management system within user interface 202 by providing one or more gestures. Such gestures may include, but are not limited to, swipes, flicks, taps, hoverings, motions, retinal tracking, and/or any other type of gesture, or any combination thereof. For example, the user may swipe a finger in a first direction of arrow 220 to be presented with musical arrangement 214 and/or in a second direction of arrow 220 to be presented with musical arrangement 224. In some embodiments, musical arrangements 214 and 224 may be substantially similar to musical arrangement 204 with the exception that they may correspond to a different musical arrangement. For example, musical arrangement 204 may correspond to an interactive musical arrangement of "The Wheels on the Bus", whereas interactive musical arrangement 214 may correspond to an interactive musical arrangement of "The Itsy Bitsy Spider".

In some embodiments, upon purchasing musical arrangement 204, the musical arrangement may be downloaded to the user device. The various parts, images, videos, and/or component pieces associated with the musical arrangement may all be downloaded to the user device. In some embodiments, after purchasing the musical arrangement, the user may connect to the content management system to interact with the musical arrangement. In this scenario, any actions taken by the user with the interactive musical arrangement may be communicated to the content management system. For example, the content management system may provide one-way communications to an application programming interface ("API"). The API may, in some embodiments, interface with the user device, and may allow any user action to be invoked or cause an output by the user device. For example, a user may select one or more component pieces to mute from the musical arrangement. The request to mute the component piece(s) may then be transmitted to the API, and the musical arrangement including the muted component piece may be transmitted back to the user device.

Figure 3:
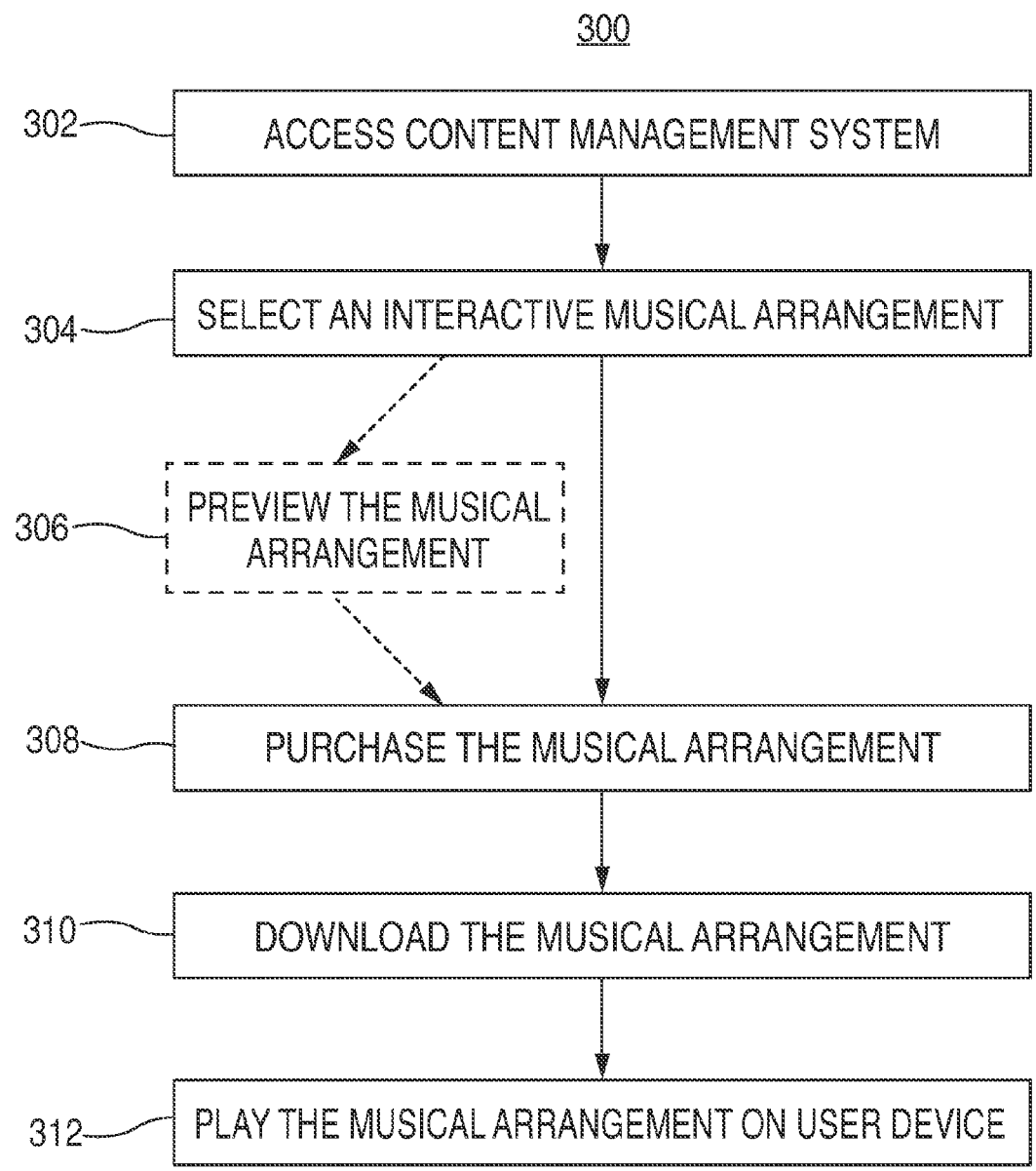
FIG. 3 is an illustrative flowchart of a process for playing an interactive musical arrangement on a user device in accordance with various embodiments.

FIG. 3 is an illustrative flowchart of a process for playing an interactive musical arrangement on a user device in accordance with various embodiments. Process 300 may begin at step 302. At step 302, a user may access a content management system using their user device. For example, a user may access a content management system including one or more interactive musical arrangements using device 100. In some embodiments, the user may be prompted to provide login credentials to gain access to the content management system. For example, the user may be asked to register or create a user account on the content management system. In this scenario, the user may be provided with a login screen upon accessing the content management system, and may provide a username and password corresponding to the register the user account.

At step 304, the user may select an interactive musical arrangement from a listing of interactive musical arrangements provided by the content management system. For example, display 200 may display musical arrangements 204, 214, and/or 224. In some embodiments, the user may provide one or more gestures to switch between and/or view the various musical arrangements. For example, the user may swipe a finger in a first direction of arrow 220 to view musical arrangement 214.

In some embodiments, process 300 may include optional step 306. At step 306, a user may preview the selected interactive musical arrangement. For example, the user may download a clip, portion, and/or selected images corresponding to the selected interactive musical arrangement. By previewing the interactive musical arrangement, the user may be able to determine whether or not to purchase the selected musical arrangement. In some embodiments, the user may not preview the selected arrangement, and may skip optional step 306.

At step 308, the user may purchase the selected musical arrangement. For example, the user may select button 208 and purchase selected musical arrangement 204. In some embodiments, the user may provide login credentials and/or purchasing information (e.g., credit card number, billing address, user account password, etc.) to purchase the musical arrangement. In some embodiments, the user may have logged into their user account previously while accessing the content management system and then upon purchasing the musical arrangement re-provide and/or automatically purchase the selected musical arrangement.

At step 310, the user may download the purchased musical arrangement from the content management system to their user device. In some embodiments, the download may be queued until the user device has a Wi-Fi connection. In other embodiments, the download may take place across any suitable internet connection. In some embodiments, multiple musical arrangements, or a musical arrangement and additional content may download from the content management system in parallel.

At step 312, the musical arrangement may play on the user device. In some embodiments, the musical arrangement may include an audio portion and a video portion. For example, if the musical arrangement corresponds to a sing-a-long or a karaoke arrangement, the words of the musical arrangement may be presented on the user interface as the audio outputs from the user device.

In some embodiments, in response to purchasing the musical arrangement, user interactions with the arrangement may occur via an API. For example, the content management system may transmit data corresponding to the arrangement with the API. The API may present the arrangement to the user on the user device, and any interactions the user takes on the user device with the musical arrangement may be transmitted back to the API. Thus, the API may facilitate communications between the user device and the musical arrangement.

Figure 4:
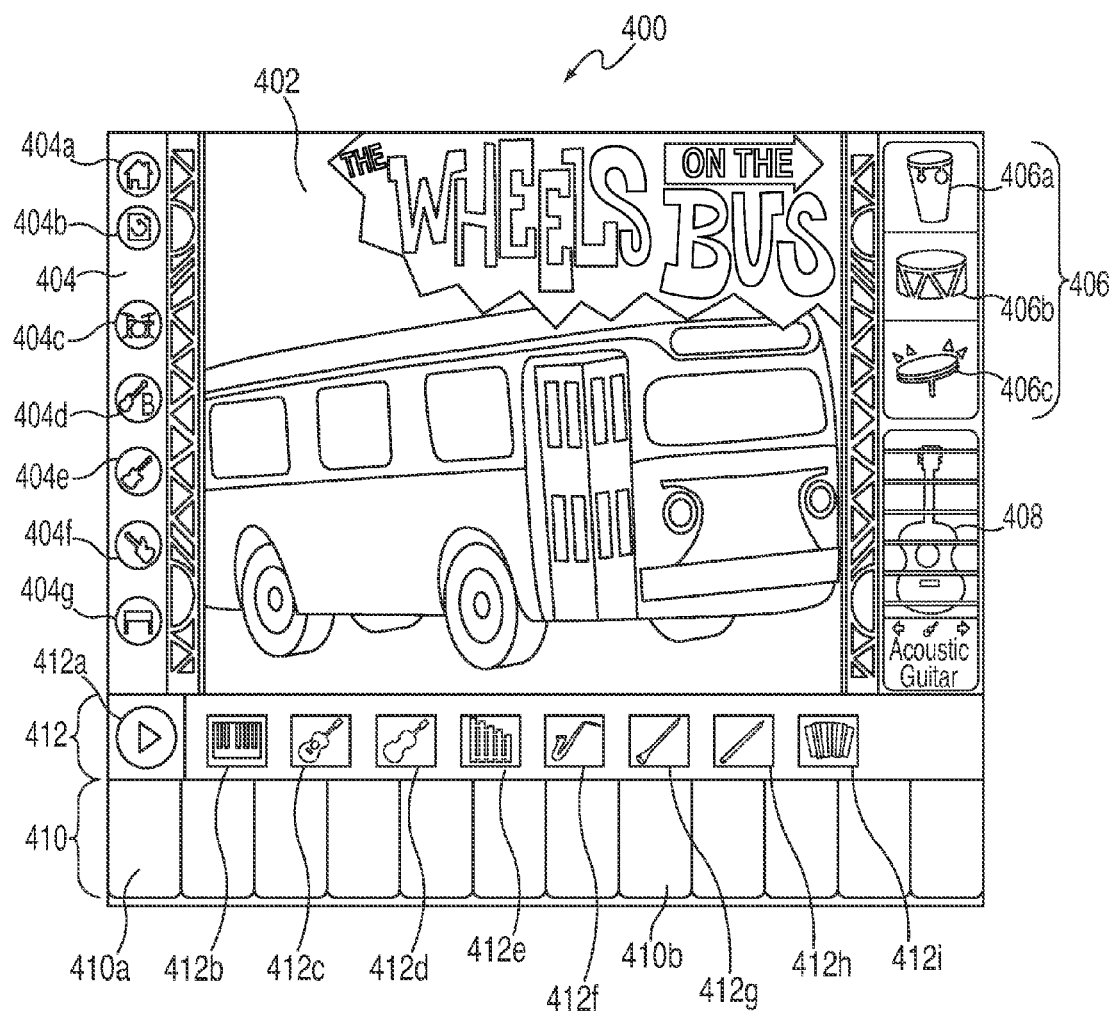
FIG. 4 is an illustrative diagram of a user interface for playing an interactive musical arrangement in accordance with various embodiments.

FIG. 4 is an illustrative diagram of a user interface for playing an interactive musical arrangement in accordance with various embodiments. User interface 400 may include display region 402. In some embodiments, a video or image corresponding to an interactive musical arrangement may be displayed within display region 402. For example, a user may be watching and listening to an interactive musical arrangement of the song "The Wheels on the Bus", and one or more images presenting the words to the song may be displayed within region 402. In some embodiments, video may be displayed within region 402 corresponding to a video portion of the interactive musical arrangement. For example, the interactive music arrangement may correspond to a music video, and the video portion of the music video may play within region 402.

User interface 400 may also include control region 404. Control region 404 may include one or more options for the user while interfacing with the interactive musical arrangement. In some embodiments, control region 404 may include home button 404a. Home button 404a may allow the user to exit out of an interactive musical arrangement currently being viewed on the user device and may return the user to a home screen. For example, after viewing a first interactive musical arrangement, the user may press home button 404a to return to a home screen where the user may be able to select or purchase other interactive musical arrangement to watch. The home screen may, in some embodiments, include all of the interactive musical arrangements that the user has previously downloaded or purchased to their user device. In some embodiments, control region 404 may also include restart button 404b. Restart button 404b may allow a user to restart an interactive musical arrangement currently being watched or played. For example, while playing "The Wheels on the Bus", the user may decide to restart the song from the beginning by pressing restart button 404b.

In some embodiments, control region 404 may also include drum button 404c, bass button 404d, acoustic guitar button 404e, electric guitar button 404f, and keyboard button 404g. A user may select one or more of buttons 404c-g to turn on/off those component pieces within the musical arrangement. For example, if a user does not want to hear the drum part of the audio being played with the interactive musical arrangement, the user may press drum button 404c, which may turn the drum part off. The user may, in some embodiments, choose to turn the drum part back on by pressing drum button 404c again. Similarly, the user may select any instrument button (e.g., buttons 404c-g) to turn off and/or turn on that instrument's component piece within the musical arrangement. In some embodiments, one or more visual features of buttons 404a-g may occur upon being pressed by the user. For example, the buttons may virtually depress, change color, become highlighted or outlined, and/or may modify in any other suitable way to indicate to the user that a particular button has been selected.

Control region 404 may include any number of buttons related to any number of functions, and the use of buttons 404a-g is merely exemplary. For example, region 404 may include a draw button that allows a user to draw figures or pictures within the interactive musical arrangement. As another example, region 404 may also include a chat button. The chat button may, in some embodiments, allow a user to communicate with one or more additional users across a network. For example, a user may be part of a multi-person interactive musical arrangement and may select the chat button to send a message to another user while playing, prior to playing, or after playing, the interactive musical arrangement.

User interface may also include percussion region 406. Percussion region 406 may, in some embodiments, include one or more percussion instruments for the user to play while interacting with the musical arrangement being presented within display region 402. For example, the user may play tambourine along with the interactive musical arrangement using a tambourine button located within percussion region 406.

In some embodiments, percussion region 406 may include first percussion region 406a, second percussion region 406b, and third percussion region 406c. Persons of ordinary skill in the art will recognize that the use of three percussion regions is merely exemplary, and one or more additional percussion regions may be added and/or one or more of percussion regions 406a-c may be omitted. In some embodiments, a user may tap or select one of percussion regions 406a-c to play a particular percussion instrument. For example, a user may press first percussion region 406c to play a tambourine. Each time the user taps on region 406c, a tambourine sound may be played. In this way, a user may interactively play a tambourine and/or another percussion instrument while playing along to the interactive musical arrangement.

In some embodiments, each of percussion regions 406a-c may allow a user to play one or more percussion instruments. The user may perform one or more gestures to select a particular percussion instrument from a plurality of percussion instruments stored and/or programmed to be included with the interactive musical arrangement. For example, third percussion region 406c may display a tambourine. However, in response to a user swiping across region 406c, a different percussion instrument may be displayed. For example, swiping from right to left across region 406 may cause a cowbell to be displayed within third percussion region 406c. In this scenario, the user may now tap and/or select region 406c to play a cowbell along with the interactive musical arrangement. Any number of percussion instruments or sounds may be capable of being played within one or more of the percussion regions including, but not limited to, tambourines, cowbells, hand claps, bongos, congas, triangles, vibraslaps, cymbals, maracas, and/or snare drums. In some embodiments, a user may manually add in additional percussion sounds by importing samples of particular musical instruments to their user device and/or user account on the content management system. For example, the user may want to include the sound of a didgeridoo, and may import the sound of an exemplary didgeridoo to their user device. In some embodiments, the user may be able to purchase additional percussion instruments from the API and/or the content management system.

In some embodiments, each of regions 406a-c may display a different percussion instrument. For example, first percussion region 406a may display a conga, second percussion region 406b may display a snare drum, and third percussion region 406c may display a tambourine. A user may tab and or select any of regions 406a-c separately or at a substantially same time to play the corresponding percussion instrument. In some embodiments, one or more of regions 406a-c may include a same instrument. For example, both regions 406a and 406c may correspond to a tambourine, and therefore a user may select either region 406a or 406c to play a tambourine along with the interactive musical arrangement. In some embodiments, multiple versions of a same type of musical instrument may be included. For example, region 406a may correspond to a small cowbell whereas region 406c may correspond to a large cowbell.

User interface 400 may also include keyboard 410. Keyboard 410 may, in some embodiments, include a full octave of keys. For example, keyboard 410 may include eight (8) keys corresponding to a root note, an octave above the root, and the six notes within that root note's scale. Persons of ordinary skill in the art will recognize that any number of keys may be used for keyboard 410 including, but not limited, to sixteen (16) keys, thirty-two (32) keys, forty-four (44) keys, or eighty-eight (88) keys. In some embodiments, keys included within keyboard 410 may be colored to help signify to the user their positioning or corresponding note. For example, key 410a may correspond to a root note of the key of the interactive musical arrangement. Key 410a may, in some embodiments, be highlighted in a first color (e.g., red) and/or include a tip or outer region having the first color. In some embodiments, key 410b may also include the same coloring scheme as key 410a signifying that both keys may correspond to a same note. For example, key 410a may correspond to the note "C", and key 410b may correspond to the note "C" that may be an octave higher in pitch than key 410a.

In some embodiments, the notes included within keyboard 410 may correspond to notes harmonically in tune with the key of the musical arrangement. For example, if the musical arrangement is in the key of "C", only notes included within the key of "C" may play when the user plays the various keys on keyboard 410 (e.g., "C", "D", "E", "F", "G", "A", "B"). In some embodiments, as the musical arrangement plays, the particular chord or key of the arrangement may change. For example, a first measure of the musical arrangement may be in the key of "C", and keyboard 410 may include appropriate notes for that particular key. However, a second measure of the musical arrangement may be in the key of "G", and therefore the notes capable of being played by keyboard 410 may change to include some or all of the keys in the key of "G" (e.g., "G", "A", "B", "C", "D", "E", "F#"). Thus, no matter the key of the musical arrangement, even as the musical arrangement plays, the user may always play harmoniously in-tune notes on keyboard 410.

In some embodiments, one or more notes capable of being played by keyboard 410 may correspond to a passing note, which may not be included within the key of the musical arrangement, but may still harmoniously fit with the musical arrangement. For example, one or more passing notes corresponding to a blues scale of the root note may be included on keyboard 410. As another example, one or more passing notes may be a sharped or flatted note.

User interface 400 may also include selection bar 412. In some embodiments, selection bar 412 may include play/pause button 412a. Play/pause button 412a may allow the user to begin playing the interactive musical arrangement on the user device. In some embodiments, if the musical arrangement is already playing, selection of, or pressing, button 412a may cause the musical arrangement to pause. The user may resume playing the musical arrangement by selecting or pressing button 412a again.

In some embodiments, selection bar 412 may also include instrument buttons 412b-i. Instrument buttons 412b-i may correspond to any musical instrument capable of being played using keyboard 410. For example, the user may select instrument button 412b corresponding to a piano. In this scenario, when the user plays keyboard 410, the outputted sounds for the keys played may correspond to notes of a piano. As another example, instrument button 412c may correspond to an acoustic guitar. In this scenario, when the user plays keyboard 410, the keys may correspond to sounds representative of an acoustic guitar. For example, a user may press a key on keyboard 410, and the outputted sound may be a single note sounding like an acoustic guitar, or the keys may correspond to a chords as if it were played on an acoustic guitar. For example, if the user plays key 410a, a chord corresponding to the note of key 410a may play. In this scenario, a user may press a key for the note "C" and the a "C" chord may play. Persons of ordinary skill in the art will recognize that keyboard 410 may play any instrument corresponding to buttons 412*b-i* including, but not limited to, keyboards, pianos, acoustic guitars, electric guitars, sitars, xylophones, saxophones, trumpets, trombones, French horns, clarinets, flutes, and/or accordions.

In some embodiments, selection bar 412 may include one or more additional features such as a record button. The record button may allow the user to record some or all of the component piece they may play with the musical arrangement. The recorded portion may be stored, in some embodiments, locally on the user device (e.g., storage 106) and/or on the content management system.

In some embodiments, selection bar 412 may include an octave bar. The octave bar may allow the user to select a particular range of notes for keyboard 410 to play within. For example, if the user is in piano mode, the octave bar may be centrally located so that the keys of keyboard 410 may correspond to those keys near or substantially near "middle C". The user may provide one or more gestures to change a highlighted area of the octave bar to allow the keys of keyboard 410 to correspond to other regions of the instrument. For example, the user may move a highlighted region of the octave bar to allow the user to play the region of a piano an octave or more above "middle C". The octave bar may be especially useful in the situation that keyboard 410 may only include a limited amount of keys. In this scenario, the user may move the octave bar to various positions to allow keyboard 410 to play various notes outside of the range of keyboard 410.

User interface 400 may also include strum pad 408. Strum pad 408 may allow user to play a string instrument along with the interactive musical arrangement. For example, a user may play a guitar part of a musical arrangement by providing strumming gestures to the strum pad. In some embodiments, the user may position the strum pad in any suitable location within user interface 400. For example, a right-handed user may position the strum pad in a lower right section of the user interface. This may allow a right-handed user to easily interact with the strum pad with their right hand while having the ability to perform other tasks or operations on the user interface with their left hand. As another example, a left-handed user may position the strum pad in a lower left section of the user interface, thereby allowing the rest of the user interface to be more easily accessed by the user's right hand.

Figure 5:
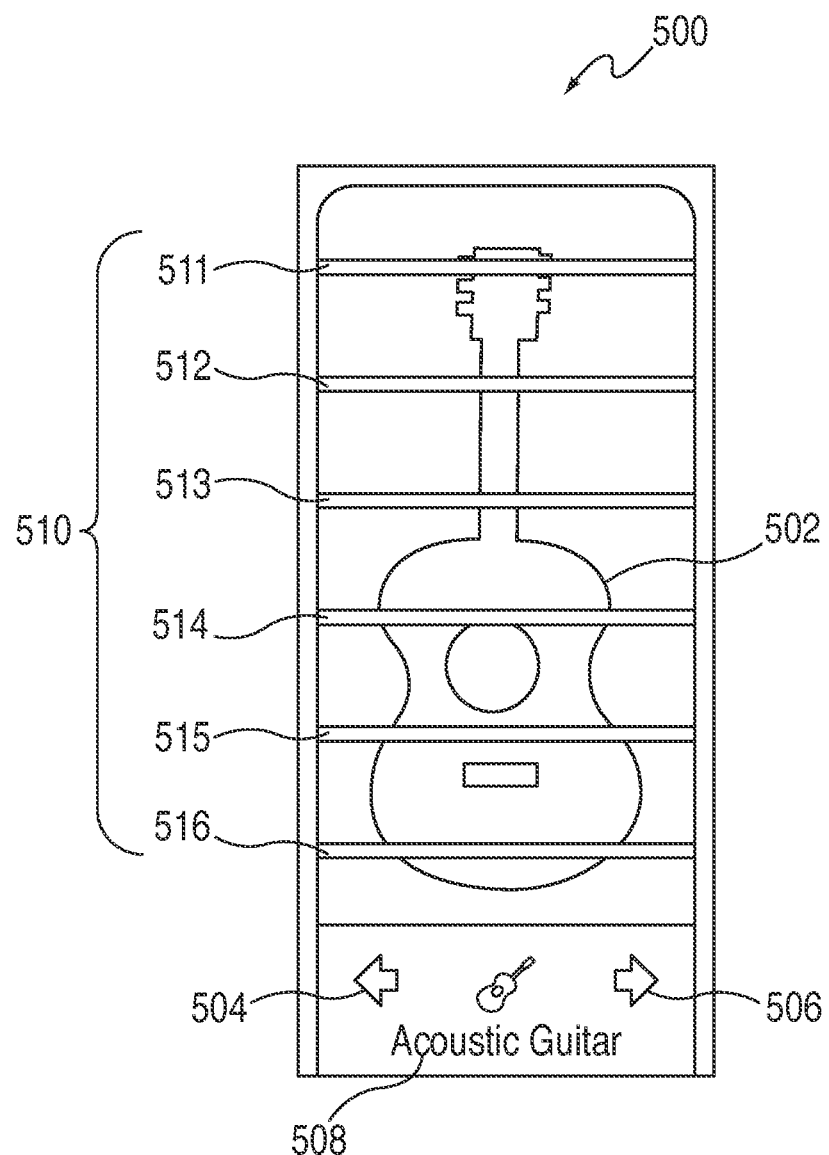
FIG. 5 is a schematic illustration of a strum pad in accordance with various embodiments.

FIG. 5 is a schematic illustration of a strum pad in accordance with various embodiments. Strum pad 500 may, in some embodiments, be substantially similar to strum pad 408 of FIG. 4, and the previous description may apply. In some embodiments, strum pad 500 may include virtual strings 510 corresponding to strings found on a stringed instrument (e.g., guitar strings). Strings 510 may be displayed within a user interface presenting strum pad 500. For example, user interface 400 of FIG. 4 may display strum pad 408, which may include virtual strings within the strum pad. Any number of strings may be included within strum pad 500, and persons of ordinary skill in the art will recognize that although six (6) strings are displayed, one or more strings may be added or omitted.

In some embodiments, strings 510 may include one or more strings corresponding to an instrument selected to be played by the strum pad. Strings 510 may include strings 511-516 which may correspond to the selected instrument's component piece. For example, a user may select an acoustic guitar to play along with an interactive musical arrangement. In this scenario, strings 511-516 may correspond to the six strings found on a standard acoustic guitar (e.g., low "E", "A", "D", "G", "B", and high "E"). As another example, the user may select a bass guitar to play along with the interactive musical arrangement, and strings 510 may include strings 511-514 corresponding to the four strings found on a stand bass guitar (e.g., "E", "A", "D", and "G").

In some embodiments, the user may select the instrument to be played by the strum pad from a grouping of instruments stored on the user device, associated with the musical arrangement, and/or on the content management system. For example, the musical arrangement may have one or more stringed instrument component pieces, and one of the stringed instruments may be selected by the user and played via the strum pad. In some embodiments, the component piece for a particular instrument may be played with the musical arrangement even if that instrument does not have a part within the arrangement. For example, if there is no ukulele part in the musical arrangement, the user may still play a ukulele part by selecting that instrument on the strum pad.

In some embodiments, the user may scroll or scan through the various instruments available to be played on the strum pad. For example, the user may select back button 504 or forward button 506 to see which stringed instruments are available to be played. As the user scans through the available stringed instruments, the name of the stringed instrument may be displayed as instrument name 508. For example, a user may currently have selected an acoustic guitar, and therefore title 508 may read "ACOUSTIC GUITAR". In some embodiments, as the user scrolls through the available instruments, an image of the instrument may be displayed within the background of strum pad 500. For example, image 502 may correspond to an image of an acoustic guitar, corresponding to title 508. As another example, the user may press button 506 to view the next instrument, which may be an electric guitar. In this scenario, title 508 may now read "ELECTRIC GUITAR" and image 502 may now correspond to an image of an electric guitar. Any number of stringed instruments may be played using the strum pad including, but not limited to, acoustic guitars, electric guitars, 7-string guitars, 12-string guitars, electric bass guitars, acoustic bass guitars, upright bass guitars, violins, cellos, violas, ukuleles, harps, and banjos.

In some embodiments, strings 510 may change depending on the selected stringed instrument. For example, if the user selects the acoustic guitar for the strum pad, strings 510 may include strings 511-516 corresponding to the six (6) respective strings found on an acoustic guitar. In response to selecting a ukulele, however, strings 510 may include four (4) strings corresponding to the four strings found on a ukulele. For example, strings 511-514 may be displayed on strum pad 500 and may be tuned to the respective ukulele string tunings (e.g., "G", "C", "E", and "A"). As another example, the user may select a banjo to be played using strum pad 500. In this scenario, strings 510 may now include strings 511-515 corresponding to the five strings typically found on a banjo and having the tunings of banjo strings (e.g., low "G", "D", high "G", "B", and "D"). Persons of ordinary skill in the art will recognize that any tuning pattern for any instrument may be implemented, and the aforementioned tunings schemes are merely exemplary. In some embodiments, a user may be capable of selecting an instrument to be played using the strum pad as well as the tuning of the selected instrument. For example, if the user selects a guitar, the user may also select the guitar to be tuned in any suitable manner (e.g., "drop-D" tuning, a half step down tuning, an open chord tuning, etc.).

In some embodiments, a user may strum across one or more of strings 510 to play a component piece corresponding to a musical arrangement. For example, a user may select a musical arrangement to play, such as "The Wheels on the Bus", and as the music for the musical arrangement plays, the user may strum along a component piece (e.g., a guitar part) for the arrangement. In some embodiments, the user may strum across all of strings 510. For example, the user may strum strings 511-516, which may cause the audio output to include each string of the currently selected instrument (e.g., acoustic guitar), to output a sound. In some embodiments, the user may only strum across a select few strings, such as strings 511 and 512. This may cause only the output corresponding to those strings to be produced along with the musical arrangement. In some embodiments, a user may tap or strum a single string of strings 510. For example, the user may tap string 511, which may cause only that string's note to play.

Typically, when an individual plays a stringed instrument, such as a guitar, one hand strums while the other hand forms chords. The combinations of specific strings being held in specific arrangements form the various musical chords capable of being played. For example, to play an "E-Major" chord on a guitar, a user may hold a first finger down on a second fret of the "A" string, a second finger down on a second fret of the "D" string, and a third finger down on a first fret of the "G" string, while keeping the rest of the strings open. If a user strums all six strings of the guitar, the resulting notes that will be played are "E", "B", "E", "G#", "B", and "E". These notes are all part of what is typically referred to as an "E-Major" chord, as they are all notes included within the key of "E-Major".

In some embodiments, as the musical arrangement plays, the output produced by strumming the strum pad may change with the music. Because the strum pad allows the user to play along with the musical arrangement with a single hand or finger, there may be no need for the second hand to form chords. Thus, as the musical arrangement plays, the interactive musical arrangement may cause the strum pad to automatically change the chords that may be outputted in response to strumming the strum pad. For example, the musical arrangement may be playing in the key of "E-Major". If the user strums the strum pad then the strum pad may output an "E-Major" chord in the sound of the selected stringed instrument (e.g., acoustic guitar 508). In some embodiments, as the musical arrangement progresses, the chord structure of the arrangement may be tracked. For example, the musical arrangement may initially be played in "E-Major", however it may change after a certain amount of time, or a certain number of measures, to play in "G-Major". In this scenario, any gesture detected by the strum pad may cause the strum pad to produce the sound of a "G-Major" chord. This may allow the user to play along with the musical arrangement no matter what the chord progression may be, thus making it much easier for a user to enjoy interacting with the musical arrangement, especially if the user may be a novice at a particular instrument. For example, a young child may play along with a simple song, such as "The Wheels on the Bus" by swiping their hand across the strum pad, thereby playing the chords associated with the song without having to form the chords with one hand and strum with the other.

In some embodiments, the user may tap one or more strings of the strum pad instead of strumming across all the strings, or the user may strum less then all the strings, and produce the same sounds that would occur if the user was physically playing the stringed instrument. For example, if the musical arrangement is in the key of "E-Major", the chord currently arranged for the strum pad may be an "E-Major" chord. As previously mentioned, the "E-Major" chord may include the notes "E", "B", "E", "G#", "B", and "E". Thus, if the user strums just the first and second strings, the output of the strum pad may be the notes "E" and "B". As another example, if the user strums across the third through sixth strings, then the notes "E", "G#", "B" and "E" may play. In some embodiments, a user may individually tap any of strings 510, thus producing the individual sounds of those strings. Continuing the previous example, if the user taps on string 511, corresponding to the first string, the outputted sound may correspond to that of the "E" note of the "E-Major" chord. As another example, if the user taps on third string 513 and then fourth string 514, the strum pad may play the notes "G#" and "B", respectively. In some embodiments, as the musical arrangement plays, the chord progression may be tracked so that the user may tap individual strings that remain in tune with the musical arrangement as the musical arrangement plays. For example, the musical arrangement may initially be in "E-Major", and the user may have tapped on string 511 corresponding to the note "E". After a certain amount of time or measures, the key may change to a "G-Major" and therefore string 511 may now correspond to the note "G". Thus, the outputted sound of string 511 may remain in tune with the musical arrangement as the chords of the musical arrangement change.

Figure 6:
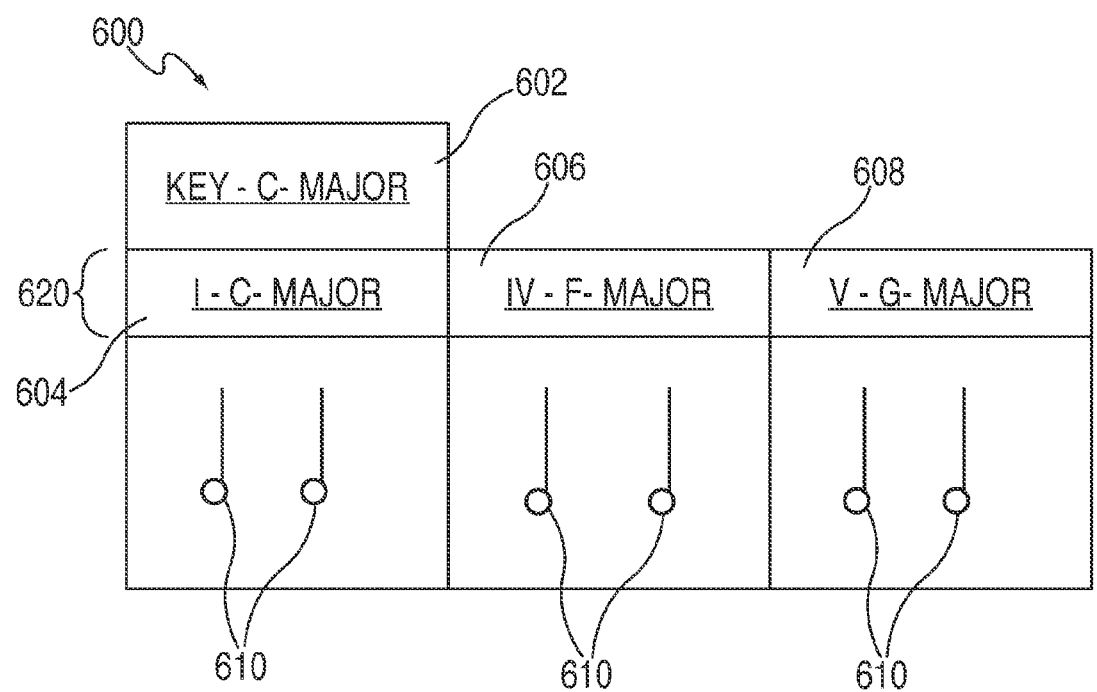
FIG. 6 is an illustrative chart of a chord progression that a strum pad may be played along to in accordance with various embodiments.

FIG. 6 is an illustrative chart of a chord progression for a musical arrangement in accordance with various embodiments. Chart 600 may include key information 602 corresponding to the musical key of an interactive musical arrangement being played on a user device (e.g., device 100). For example, key information 602 may indicate that the musical arrangement may be in the key of "C-Major". Persons of ordinary skill in the art will recognize that any key may be used and/or displayed within key information 602, and the use of "C-Major" is merely exemplary.

Chart 600 may also include chord progression 620. Chord progression 620 may indicate the chords to be played by a musical arrangement. In some embodiments, chord progression 620 may indicate a portion of the musical arrangement however any amount of the musical arrangement may be charted. For example, chord progression 620 may include chords 604, 606, and 608. Chord 604 may correspond to a first chord, or root chord, of key 602. For example, chord 604 may correspond to a "C-Major" chord, which may be the root chord (or note) of the interactive musical arrangement playing in the key of "C-Major". Chords 606 and 608 may respectively correspond to a fourth and fifth chord or note of key 602. For example, the fourth and fifth chords of "C-Major" are "F-Major" and "G-Major", respectively. Thus, as the musical arrangement plays, chord progression 620 may indicate that the musical arrangement plays a first chord, a fourth chord, and then a fifth chord.

Strum indicators 610 may indicate a particular point during the musical arrangement where the user may provide a gesture to a strum pad, such as strum pad 500 of FIG. 5. For example, as the musical arrangement plays, the arrangement and its corresponding chord progression may be tracked. Thus, if a user provides a gesture while chord progression 620 of the musical arrangement is playing chord 604, the outputted audio signal may correspond to chord 604. For example, if the user provides a gesture to the strum pad while the musical arrangement plays in "C-Major" (e.g., chord 604), the outputted component piece from the user device may be a "C-Major" chord. As another example, if the user provides a gesture to the strum pad while the musical arrangement plays in "G-Major" (e.g., chord 606), the outputted component piece may be an "F-Major".

In some embodiments, the outputted component piece may change in response to chord progression 620 changing from a first chord to a second chord. For example, the user may continually strum on the strum pad as the chord progression of the musical arrangement is tracked. As the user strums, the outputted audio signal may change in response to the chord changes of the chord progression. For example, as the user strums, chord progression 620 may change from being in the key of chord 604 to being in the key of chord 606. Thus, the outputted audio signal may change from playing a "C-Major" chord to an "F-Major" chord in response to the musical arrangement changing the key that it is in.

The user's strumming may allow the user to output audio that may be musically in-time with the musical arrangement. This may allow the user to continually play music that is harmonious with the interactive musical arrangement. By enabling the user to continually play music along with the musical arrangement, users having a variety of skill levels may each take part in playing the musical arrangement and play harmonious music. This may be especially beneficial for young children who may not have developed the coordination to play instruments, such as the guitar, but still would like to play along with interactive musical arrangements.

In some embodiments, strumming indicators 610 may correspond to any type of input by the user. For example, the user may "pluck" an individual string or strings on the strum pad. Indicators 610 may, in this scenario, correspond to "plucks" by the user. In some embodiments, the user may be able to pluck individual strings of the strum pad's selected instrument, and each string may be maintained in tune with the chord progression. For example, as chord progression 620 of the musical arrangement plays, the user may pluck individual strings (e.g., strings 510 of FIG. 5) associated with an acoustic guitar playable with the strum pad.

As an illustrative example, the musical arrangement may play music following chord progression 620. The user may individually pluck or tap one or more of the strings on the strum pad (e.g., strings 511-516), and individual string sounds may output from the user device. In some embodiments, the individual string outputs may correspond to the key currently being played by chord progression 620 of the musical arrangement as well as the notes of the various strings that make up that particular chord. For example, while the musical arrangement plays in the key of chord 604 corresponding to "C-Major", the user may tap or pluck an individual string from strings 511-516 of FIG. 5, which collectively may correspond to the "C-Major" chord. Thus, any string that the user taps may be both in-tune and in-time with the musical arrangement as it plays. The user may continually tap strings as chord progression 620 is tracked, and the tapped strings may output audio that may conform to the key associated with the chord progression of the musical arrangement. Thus, even as the musical arrangement plays, the user may tap on strings to play notes in-time and in-tune with the musical arrangement.

Figure 7:
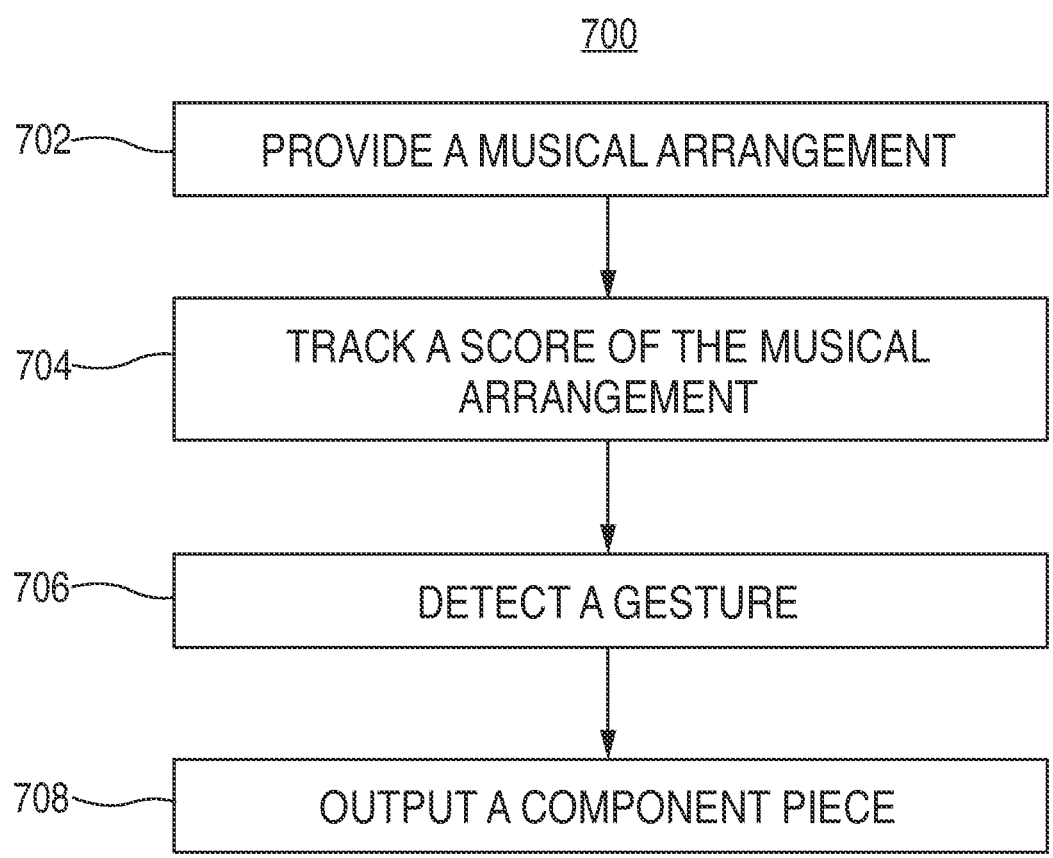
FIG. 7 is an illustrative flowchart of a process for playing along with a musical arrangement in accordance with various embodiments.

FIG. 7 is an illustrative flowchart of a process for playing along with a musical arrangement in accordance with various embodiments. Process 700 may begin at step 702. At step 702, a musical arrangement may be provided on a user device. In some embodiments, the musical arrangement may be an interactive musical arrangement and may include an audio portion and a video portion. For example, the interactive musical arrangement may correspond to an interactive version of "The Wheels on the Bus". In some embodiments, the musical arrangement may be displayed on a user interface presented on the user device. For example, user interface 400 of FIG. 4 may include video display region 402, which may display a video portion or images associated with the interactive musical arrangement displayed thereon.

At step 704, a score of the musical arrangement may be tracked as it plays. In some embodiments, as the musical arrangement plays, the chord progression associated with the musical arrangement may be tracked. For example, chord progression 620 of FIG. 6 may track a musical arrangement being played on a user device. By tracking the score of the musical arrangement, a current chord of the musical arrangement may be determined. For example, chord progression 620 may indicate that the musical arrangement is playing a "C-Major" chord followed by a "F-Major" chord followed by a "G-Major" chord.

At step 706, a gesture may be detected on the user device while the user device plays the musical arrangement. In some embodiments, the user device may include a display screen, such as a touch-sensing display screen. The display screen may, in some embodiments, display a user interface including a strum pad. For example, user interface 400 of FIG. 4 may present strum pad 408 therein. In some embodiments, the user may provide a gesture to the user interface that may be detected by the input circuitry on the user device and processed by control circuitry on the user device. For example, in response to detecting a user swiping across a strum pad, an audio signal may be produced.

In some embodiments, the strum pad may include one or more virtual strings corresponding to one or more stringed instruments capable of being played on the strum pad. For example, strum pad 500 of FIG. 5 may include strings 510. In some embodiments, strings 510 may correspond to a selected component piece to be played with the musical arrangement. For example, strum pad 500 may have been selected to output audio corresponding to an acoustic guitar, and therefore strings 510 may include virtual strings 511-516 corresponding to the six (6) strings typically found on an acoustic guitar (e.g., low E, A, D, G, B, E). In some embodiments, the detected user input may correspond to the user providing a virtual strumming motion across all the strings, two or more strings, and/or a tap or a "pluck" of one or more strings. Persons of ordinary skill in the art will recognize that any number of stringed instruments having any number of strings may be displayed within the strum pad, and the use of an acoustic guitar having six (6) strings is merely exemplary.

At step 708, the user device may output a component piece for the musical arrangement. In some embodiments, the outputted component piece may be played in response to the gesture being detected on the user device. For example, the user may strum on strum pad 500, and a component piece corresponding to a selected stringed instrument (e.g., guitar part) may output in response. In some embodiments, the outputted component piece may correspond to the tracked score of the musical arrangement. For example, chord progression 620 may indicate that the musical arrangement may change from playing music in the key of chord 604 to playing music in the key of chord 606. In response to detecting a gesture, such as a strum, while the chord progression is playing chord 604, the user device may output a component piece corresponding to chord 604. Furthermore, if the user strums the strum pad while the chord progression plays in the key of chord 606, the outputted component piece of the strum pad may correspond to chord 606. Thus, regardless of when the user may strum or provide a gesture to the user device, the outputted component piece may be in-time with the musical arrangement as well as be harmonically in-tune with the current position, chord, or key of the musical arrangement.

In some embodiments, the key of the musical arrangement may be determined. For example, if the selected musical arrangement is in the key of "C-Major", the user device and/or the strum pad may determine the key and provide component pieces in-tune with the key of "C-Major". Thus, only chords in the key of the musical arrangement may be outputted by the selected component piece. In this scenario, harmonious sounds for the musical arrangement may be produced.

In some embodiments, the chords in the key of the musical arrangement may be based on the root note of the key of the musical arrangement. Continuing the aforementioned example, if the musical arrangement is in the key of "C-Major", the root note may be "C". If the key of the musical arrangement is a major key (e.g., "C-Major"), then the chords of that key correspond to a major chord of the root note, fourth note, and fifth note, and minor chords of the second, third, sixth, and seventh notes. In other keys, such as a minor key, the chords may vary. For example, in the key of "A-Minor", the root note may be "A", and the chords within the key may include a minor chord of the first, second, fourth, and fifth notes, whereas the third, sixth, and seventh notes may be major chords.

Figure 8:
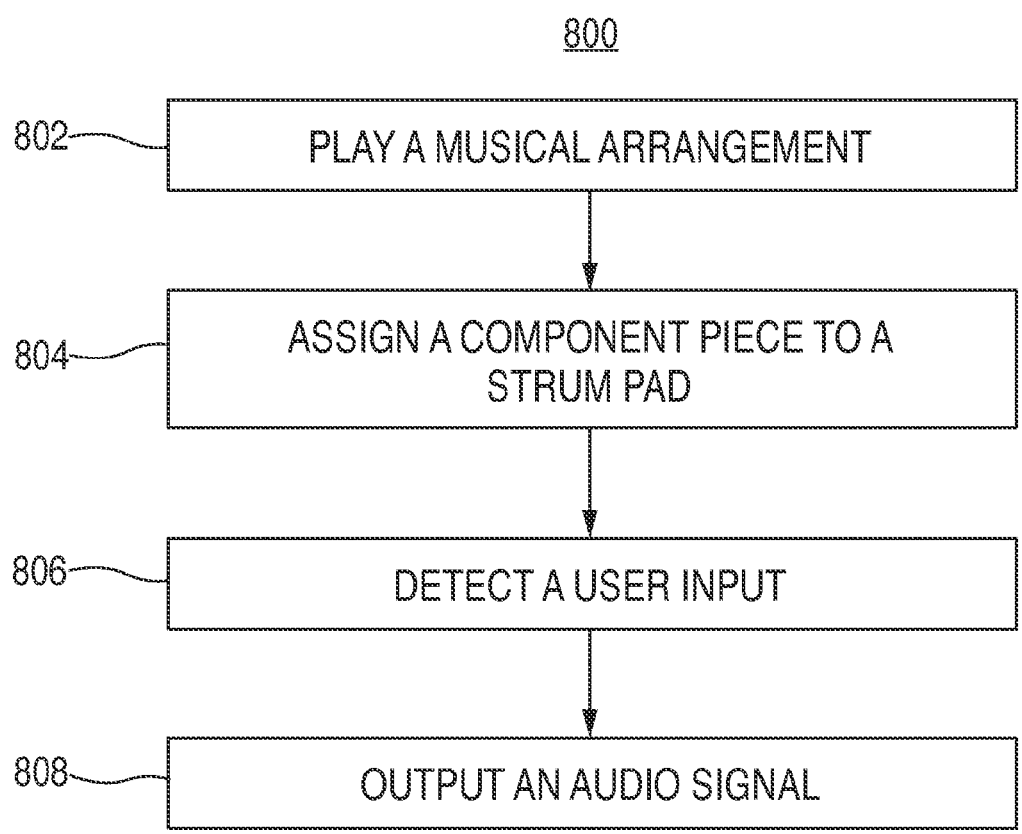
FIG. 8 is an illustrative flowchart of a process for outputting an assigned component piece in accordance with various embodiments.

FIG. 8 is an illustrative flowchart of a process for outputting an assigned component piece in accordance with various embodiments. Process 800 may begin at step 802. At step 802, a musical arrangement may play on a user device using one or more audio outputs (e.g., speakers). In some embodiments, step 802 of FIG. 8 may be substantially similar to step 702 of FIG. 7, and the previous description of the latter may apply.

At step 804, a component piece from the musical arrangement may be assigned to a strum pad. In some embodiments, the user device may include a display screen. The display screen may, in some embodiments, display a strum pad, such as strum pad 408 of FIG. 4. The strum pad may capable of outputting audio that may correspond to a stringed instrument. For example, the strum pad may be assigned a particular stringed instrument, such as an acoustic guitar. Any stringed instrument may be assigned to the strum pad including, but not limited to, acoustic guitars, electric guitars, violins, violas, cellos, bass guitars, ukuleles, banjos, and harps. In some embodiments, a picture of the assigned stringed instrument for the component piece may be displayed within the strum pad on the user interface. For example, strum pad 500 of FIG. 5 may be assigned an acoustic guitar part as its component piece, and image 502 may correspond to an image of an acoustic guitar.

At step 806, a user input may be detected with the strum pad. For example, the user may perform a strumming gesture or motion on the strum pad. In some embodiments, the type of user input detected by the strum pad may correspond to the component piece and associated stringed instrument assigned to the strum pad. For example, the detected gesture may be a strumming motion, similar to a motion an individual would provide while playing a physical acoustic guitar. As another example, the detected user input may be a pluck or slap, which may correspond to a bass guitar, and therefore the strum pad may be assigned a bass guitar part.

At step 808, an audio signal for the assigned component piece may be outputted in response to detecting the user input. In some embodiments, the audio signal may be outputted using one or more audio outputs of the user device in addition to the musical arrangement. For example, the user device may include one or more speakers for outputting sound. In response to the user providing an input (e.g., strumming gesture), the component piece assigned to the strum pad may output the corresponding audio signal through the one or more speakers. In some embodiments, the user may select one or more component pieces to turn on or off while the musical arrangement plays. For example, the musical arrangement may include a guitar, a bass guitar, vocals, and percussion. A user may select one or more buttons, such as buttons 404c-g of FIG. 4, to turn on or off one or more of the aforementioned examples.

Figure 9:
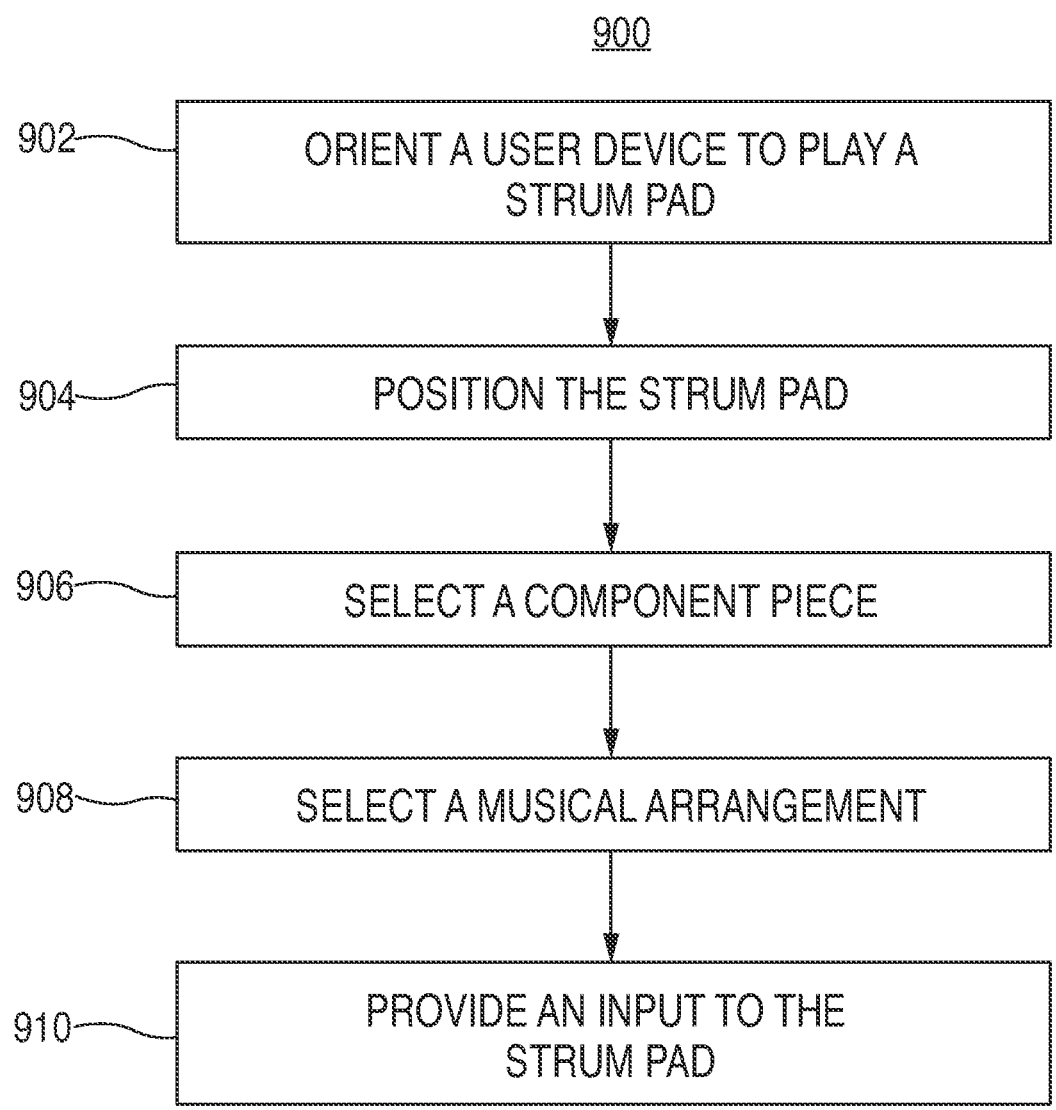
FIG. 9 is an illustrative example of a process for playing a strum pad in accordance with various embodiments.

FIG. 9 is an illustrative flowchart of a process for playing a strum pad in accordance with various embodiments. Process 900 may begin at step 902. At step 902, a user device may be oriented to play a strum pad. In some embodiments, the strum pad may be displayed within a user interface presented on a display screen of a user device. In some embodiments, the orientation of the strum pad may correspond to the instrument that the user may want to play with an interactive musical arrangement. For example, if the user wants to play an acoustic guitar using the strum pad, the user may orient the user device substantially like an acoustic guitar would be held (e.g., elevated to the user's waist and horizontal). As another example, if the user wants to play a harp using the strum pad, the user may orient the user device substantially vertical as if the user device were a harp.

At step 904, the strum pad may be positioned on the user interface. In some embodiments, the positing of the strum pad may be based on a user preference. Strum pad 408 of FIG. 4 may, for example, be positioned in any suitable portion of user interface 400. For example, if the user of the device is right-handed, the user may position the strum pad in a lower right portion of user interface 400, thus making it easier for a right-handed user to interact with strum pad 408 while being capable of interacting with the other features of user interface 400 with their left hand. Conversely, if the user of the device is left-handed, the user may position strum pad 408 in a lower left portion of user interface 400. Persons of ordinary skill in the art will recognize that the user may position the strum pad at any suitable position on user interface 400 based on any user preference. For example, the user may rotate the strum pad 90-degrees and/or enlarge or shrink the strum pad.

At step 906, a component piece to be played by the strum pad may be selected based on the orientation of the user device. For example, the user may hold the user device substantially horizontal like a guitar. In this scenario, a guitar may be selected as the component piece for the strum pad based on the device being orientated substantially like a guitar would be. As another example, the user may have oriented their user device like a harp in a substantially vertical position. In this scenario, the selected component piece for the strum pad may be a harp based on the user device being oriented substantially like a harp would be positioned.

At step 908, a musical arrangement may be selected to be played along with the component piece. In some embodiments, the musical arrangement may be selected because it may include the selected component piece. For example, if the selected component piece is a guitar, the user may select a musical arrangement including a guitar part. However, the musical arrangement may also be selected because it may be capable of having a component piece added or played along with it. For example, a song may not have a guitar part, but based on the musical arrangement's chord progression, a guitar part may be capable of being played along with the musical arrangement.

At step 910, an input may be provided to the strum pad. In some embodiments, the provided input may cause the user device to play the selected component piece along with the musical arrangement. For example, if the selected component piece is a guitar, then in response to providing an input to the strum pad, a guitar part may play along with the musical arrangement from the user device. In some embodiments, the input may be provided in a direction corresponding to the orientation and position of the strum pad. For example, strum pad 500 of FIG. 5 may be positioned such that strings 511-516 are horizontal and parallel to one another. In this scenario, the user may swipe the strum pad in an up-down and/or down-up direction. Swiping the strum pad in those directions may cause the selected component piece for the strum pad to play on the user device. In some embodiments, the direction of the input may also correspond to the orientation of the strum pad. For example, the user may be holding the user device vertical and therefore the strum pad may be positioned such that the strings are vertical. This may cause the strum pad to look substantially similar to strum pad 500, with the exception that it may be rotated 90-degrees to the right or left. In this scenario, the user may provide an input in the direction of the strings of the strum pad, which may be left-right and/or right-left. Persons of ordinary skill in the art will recognize that any orientation and position of the user device and strum pad may be used, and the input provided by the user may be in any suitable direction(s), and the use of a left-right and/or up-down (or vice versa) input is merely exemplary.

Figure 10:
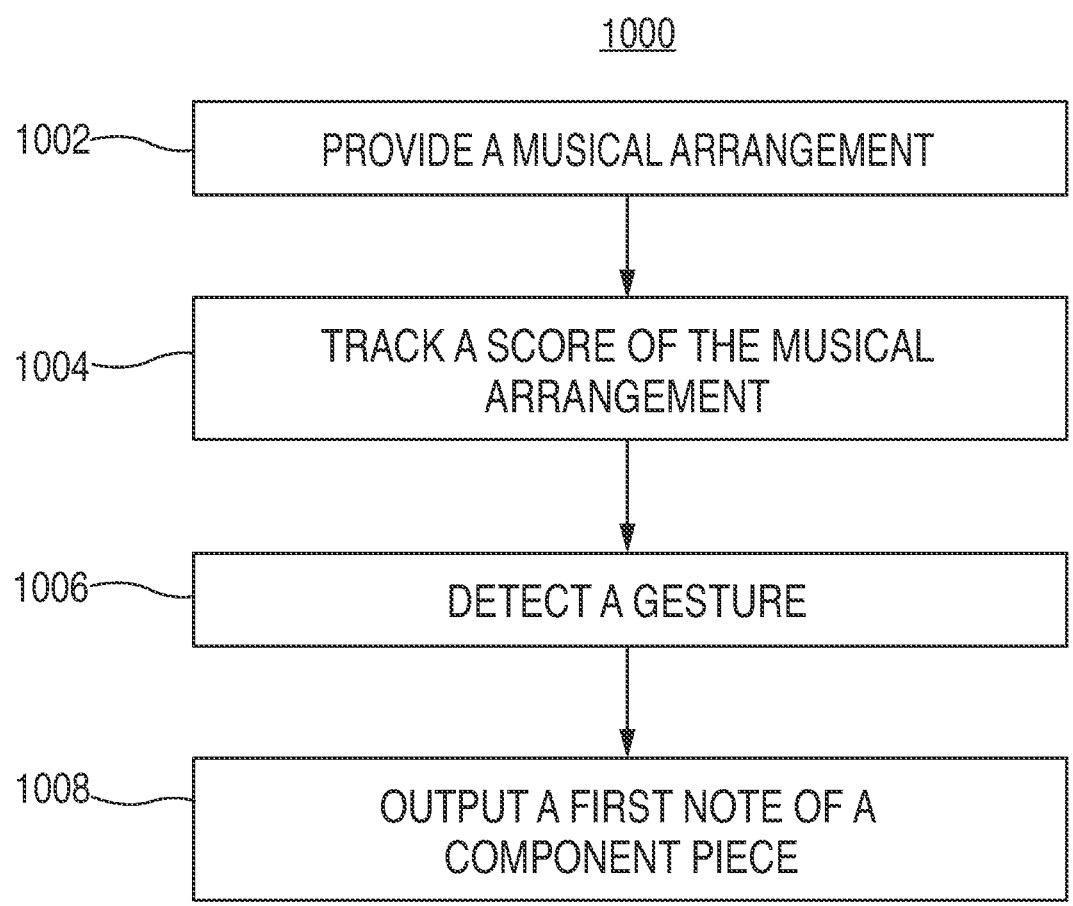
FIG. 10 is another illustrative flowchart of a process for playing along with a musical arrangement in accordance with various embodiments.

FIG. 10 is another illustrative flowchart of a process for playing along with a musical arrangement in accordance with various embodiments. Process 1000 may begin at step 1002, a musical arrangement may be provided on the musical arrangement. At step 1004, a score of the musical arrangement may be tracked as the musical arrangement plays. In some embodiments, steps 1002 and 1004 of FIG. 10 may be substantially similar to steps 702 and 704 of FIG. 7, and the previous description of the latter may apply to the former.

At step 1006, a strum pad may detect a gesture. The strum pad may be displayed on a user interface displayed on a user device. For example, strum pad 408 of FIG. 4 may be displayed on user interface 400. In some embodiments, the strum pad may include virtual strings, such as strings 511-516 of strum pad 500 of FIG. 5. The gesture may, in some embodiments, interact with a first virtual string of the strum pad. For example, the first gesture may correspond to the user tapping on string 511. In some embodiments, the first gesture may interact with two or more strings of the strum pad. For example, the user may provide a swiping motion across strings 511 and 512.

At step 1008, a first note of the component piece may be outputted in response to the detected gesture. In some embodiments, the first note may be in a key of the musical arrangement. For example, the musical arrangement may be in the key of "C-Major", and the first note may correspond to a note within the key of "C-Major". In some embodiments, the musical arrangement may have a chord progression that may change as the score of the musical arrangement plays. For example, the musical arrangement may initially play one measure in the key of "C-Major" followed by a measure of "F-Major". In this scenario, as the musical arrangement plays, the user may provide the gesture and depending on where the tracked score of the musical arrangement may be, a note from either the "C-Major" chord or the "F-Major" chord may be outputted. This may be substantially similar to what a user may experience if they were playing a physical guitar, except the position of the chords may be automatically performed in time with the musical arrangement and the inputted gesture may correspond to the user's strumming hand.

The various embodiments described herein may be implemented using a variety of means including, but not limited to, software, hardware, and/or a combination of software and hardware. The embodiments may also be embodied as computer readable code on a computer readable medium. The computer readable medium may be any data storage device that is capable of storing data that can be read by a computer system. Various types of computer readable media include, but are not limited to, read-only memory, random-access memory, CD-ROMs, DVDs, magnetic tape, or optical data storage devices, or any other type of medium, or any combination thereof. The computer readable medium may be distributed over network-coupled computer systems. Furthermore, the above described embodiments are presented for the purposes of illustration are not to be construed as limitations.

What is claimed is:

1. A method for playing along with a musical arrangement, comprising:
   playing a musical arrangement on a user device;
   tracking a score of the musical arrangement by determining a position of the musical arrangement as the musical arrangement plays;
   detecting a gesture on the user device while the user device is playing the musical arrangement; and
   outputting, in response to the detected gesture, a component piece for the musical arrangement corresponding to the tracked score of the musical arrangement, wherein outputting
   comprises producing an audio signal corresponding to a chord, the chord being harmonically in tune with the position of the tracked score of the musical arrangement without having the detected gesture on the user device harmonically in tune.

2. The method of claim 1, wherein outputting further comprises:
   playing the audio signal using an output interface located on the user device.

3. The method of claim 1, further comprising:
   determining a key of the provided musical arrangement.

4. The method of claim 3, wherein outputting comprises:
   producing an audio signal corresponding to a chord within the key of the musical arrangement.

5. The method of claim 4, wherein the produced chord within the key of the musical arrangement comprises at least one of:
   a major chord of a root note of the key;
   a minor chord of a second note of the key;
   a minor chord of a third note of the key;
   a major chord of a fourth note of the key;
   a major chord of a fifth note of the key;
   a minor chord of a sixth note of the key; and
   a minor chord of a seventh note of the key.

6. The method of claim 1, wherein tracking comprises:
   determining a current chord of the musical arrangement in time as the musical arrangement plays.

7. The method of claim 1, wherein outputting comprises:
   producing at least one note in a key of the musical arrangement.

8. The method of claim 7, wherein producing comprises:
producing at least one of a root note, second note, third note, fourth note, fifth note, sixth note, and seventh note, of the key.

9. The method of claim 1, wherein detecting comprises:
detecting the gesture on a strum pad displayed on a user interface of the user device.

10. The method of claim 9, wherein the strum pad comprises at least four virtual strings, the detected gesture comprises at least one of:
a strumming motion across at least two of the at least four virtual strings;
a strumming motion across all the virtual strings of the at least four virtual strings; and
a tap on at least one of the at least four virtual strings.

11. A mobile device comprising:
a touch-sensing display screen displaying a strum pad;
at least one audio output; memory; and control circuitry operative to:
play a musical arrangement using the at least one audio output; track a score of the musical arrangement by determining a position of the musical arrangement as the musical arrangement plays;
assign a component piece from the musical arrangement to the strum pad;
detect a user input with the strum pad; and output, in response to the detected user input, an audio signal for the assigned component piece using the at least one audio output, along with the musical arrangement, wherein the audio signal corresponds to a chord,
the chord being harmonically in tune with the position of the tracked score of the musical arrangement without having the detected gesture on the user device harmonically in tune.

12. The mobile device of claim 11, wherein the touch-sensing display further comprises:
displaying at least four virtual strings parallel to one another on the strum pad.

13. The mobile device of claim 12, wherein:
the detected user input interacts with at least one of the displayed at least four virtual strings.

14. The mobile device of claim 11, wherein:
the assigned component piece from the musical arrangement corresponds to a first stringed instrument; and
the first stringed instrument is selected from a plurality of stringed instruments stored in memory.

15. The mobile device of claim 11, wherein the control circuitry is further operative to:
select the component piece from the musical arrangement to be assigned to the strum pad, wherein the component piece is selected from a plurality of component pieces operable to be played using the strum pad.

16. The mobile device of claim 15, wherein the plurality of component pieces comprises at least one of:
an acoustic guitar;
an electric guitar;
a ukulele;
a banjo; and
a harp.

17. The mobile device of claim 11, wherein the detected user input corresponds to a strumming motion performed on the strum pad.

18. A method for playing a strum pad displayed on a user device, comprising;
orientating the user device to play a strum pad displayed within a user interface of the user device;
placing the strum pad on the user interface based on a user preference;
selecting a component piece based on the orientation;
selecting a musical arrangement to play the component piece along to;
tracking a score of the selected musical arrangement by determining a position of the musical arrangement as the musical arrangement plays; and
providing an input to the strum pad to play the component piece with the musical arrangement by producing an audio signal corresponding to a chord, the chord being harmonically in tune with the position of the tracked score of the musical arrangement, wherein the input is provided in a direction corresponding to the orientation and placement of the strum pad.

* * * * *